(12) United States Patent
Butragueno-Martinez et al.

(10) Patent No.: US 12,370,755 B2
(45) Date of Patent: Jul. 29, 2025

(54) METHOD FOR MANUFACTURING A SANDWICH PANEL WITH IMPROVED IMPACT AND DAMPING BEHAVIORS

(71) Applicant: Airbus Operations S.L., Getafe (ES)

(72) Inventors: Asuncion Butragueno-Martinez, Getafe (ES); Veronica Barcelo Castello, Getafe (ES); Matilde De La Mota Mendiola, Getafe (ES); Jesus Javier Vazquez Castro, Getafe (ES)

( * ) Notice: Subject to any disclaimer, the term of this patent is extended or adjusted under 35 U.S.C. 154(b) by 482 days.

(21) Appl. No.: 17/867,911

(22) Filed: Jul. 19, 2022

(65) Prior Publication Data

US 2023/0024567 A1  Jan. 26, 2023

(30) Foreign Application Priority Data

Jul. 21, 2021 (EP) ..................................... 21382664

(51) Int. Cl.
| | |
|---|---|
| *B32B 38/08* | (2006.01) |
| *B29C 70/34* | (2006.01) |
| *B29C 70/48* | (2006.01) |
| *B29K 101/12* | (2006.01) |
| *B29K 105/00* | (2006.01) |
| *B29K 105/08* | (2006.01) |
| *B29K 105/26* | (2006.01) |
| *B29L 7/00* | (2006.01) |
| *B32B 37/14* | (2006.01) |

(52) U.S. Cl.
CPC ............ *B29C 70/342* (2013.01); *B29C 70/48* (2013.01); *B32B 38/08* (2013.01); *B29K 2101/12* (2013.01); *B29K 2105/0097* (2013.01); *B29K 2105/0854* (2013.01); *B29K 2105/26* (2013.01); *B29K 2995/0039* (2013.01); *B29L 2007/002* (2013.01); *B32B 37/146* (2013.01); *B32B 2250/40* (2013.01)

(58) Field of Classification Search
CPC ........................... B32B 2250/40; B29C 70/48
USPC .................................................. 156/230, 231
See application file for complete search history.

(56) References Cited

U.S. PATENT DOCUMENTS

| | | | | |
|---|---|---|---|---|
| 4,994,317 A | * | 2/1991 | Dugan ................. | D06N 3/0063 442/72 |
| 5,460,865 A | * | 10/1995 | Tsotsis .................... | E04C 2/365 428/116 |
| 8,156,710 B1 | * | 4/2012 | Pien ....................... | E04F 15/107 52/177 |

(Continued)

FOREIGN PATENT DOCUMENTS

EP  3476586 A1  5/2019

OTHER PUBLICATIONS

European Search Report; priority document.

*Primary Examiner* — Scott W Dodds
(74) *Attorney, Agent, or Firm* — Greer, Burns & Crain, Ltd.

(57) ABSTRACT

A method for manufacturing an aeronautical panel with improved impact and damping behaviors. The method is applicable not only to flat panels but also to curved or highly curved panels, whatever their size and the shape of their core. The manufactured sandwich panels comprise dry fiber mats made from fabric material and/or non-crimp fabric material. In a particular embodiment, the fabric material and/or the non-crimp fabric material comprise dry fibers which are recycled and/or reused fibers.

14 Claims, 5 Drawing Sheets

(56) References Cited

U.S. PATENT DOCUMENTS

| | | |
|---|---|---|
| 2004/0146687 A1 | 7/2004 | Fournier et al. |
| 2009/0252921 A1* | 10/2009 | Bottler ................. B32B 5/28 |
| | | 428/116 |
| 2018/0093446 A1 | 4/2018 | Ogale |
| 2019/0118929 A1 | 4/2019 | Owens |
| 2021/0129641 A1* | 5/2021 | Hawkins ............... B60J 7/1607 |

* cited by examiner

METHOD FOR MANUFACTURING A SANDWICH PANEL WITH IMPROVED IMPACT AND DAMPING BEHAVIORS

CROSS-REFERENCES TO RELATED APPLICATIONS

This application claims the benefit of the European patent application No. 21382664.7 filed on Jul. 21, 2021, the entire disclosures of which are incorporated herein by way of reference.

FIELD OF THE INVENTION

The present invention belongs to the field of composites manufacturing, and particularly, it refers to a method for manufacturing an aeronautical sandwich panel with improved impact and damping behaviors. The method is applicable not only to flat panels but also to curved or highly curved panels, whatever their size and the shape of their core.

The manufactured sandwich panels comprise dry fiber mats made from fabric material and/or non-crimp fabric material. In a particular embodiment, the fabric material and/or the non-crimp fabric material comprise dry fibers which are recycled and/or reused fibers.

BACKGROUND OF THE INVENTION

Panels of composite materials are typically used in aeronautics as a lightweight solution. In an aircraft, they are normally used for floor panels, for aerodynamic fairings (i.e., belly fairing, trailing edges or leading edges), for the access doors or covers (e.g., landing gear doors), and for the internal panels thereof.

In general, these panels comprise a sandwich structure formed by a core surrounded by composite plies at both sides. The specific material used for the panels depends on the temperature mapping, corrosion constraints in order to avoid galvanic corrosion with adjacent parts, and the required strength for the intended installing location. Pre-impregnated CFRP (carbon fiber reinforced polymer) or GFRP (glass fiber reinforced polymer) are used and, to improve mutual adhesion, an adhesive layer at the interface between the plies and the core can be placed. This is important since the resin present in the preimpregnated plies is deemed as insufficient to produce a good meniscus at plies to core interface.

Honeycomb cores are solutions traditionally used with preimpregnated materials because of their low resin flow, which in some cases prevents resin from entering the open cells of the honeycomb. For panels using dry fiber technologies, closed-cell foam cores can be also used.

The existing manufacturing process is a manual process. All the materials used in the part and the ancillary materials used during the manufacturing process are placed and adapted to the different geometries by hand.

Therefore, there is a need in the industry for an easy, quick, reliable, and effective fabrication of panels that can be applied extensively regardless of the intended geometry while assuring an improvement in the mechanical properties thereof.

SUMMARY OF THE INVENTION

The present invention provides a solution for the aforementioned problems, by a method for manufacturing a sandwich panel.

In a first inventive aspect, the invention provides a method for manufacturing a sandwich panel, the method comprising:
  providing at least two dry fiber mats, each dry fiber mat being made from fabric material or non-crimp fabric material;
  providing a panel core comprising two faces;
  laying-up the dry fiber mats on the panel core, at least one dry fiber mat being laid on each face of the panel core;
  impregnating with resin the dry fiber mats and the panel core, once laid-up, by a resin infusion process under vacuum; and
  obtaining the sandwich panel by curing the resin under vacuum and temperature cycle.

The present method is a new automated method of producing sandwich panels by resin infusion process, using fabric material and/or non-crimp fabric material.

Particularly, the present method provides at least two dry fiber mats, each one being made from fabric material or non-crimp fabric material.

Along the entire document, the term "mat" will be understood as a ply.

According to the present invention, a mat made of fabric material provides a woven dry fiber mat, while a mat made of non-crimp fabric material provides a non-woven dry fiber mat.

In an embodiment, the dry fiber of the fabric or non-crimp fabric materials is carbon fiber or glass fiber or a combination of both.

In a particular embodiment, a mat made of fabric material or non-crimp fabric material comprises recycled dry fibers with different orientations within the material. These mentioned recycled dry fibers are mixed forming a thin woven or non-woven dry fiber mat with 2D isotropy and no preferred fiber orientation, that is, these recycled dry fibers that conform the dry fiber mat are misaligned. The misalignment of the recycled dry fibers of the dry fiber mat must be understood as that the recycled dry fibers are not aligned in any particular direction but rather they change their alignment in X, Y and Z directions. Advantageously, this dry fiber mat made of recycled dry fibers with different orientations within the fabric or non-crimp fabric material is more resistant to low energy impacts than current fabrics used for panels in the prior art. In the present document the mentioned fabric or non-crimp fabric material made of recycled dry fibers with different orientations within the material will be referred to as "misaligned fibers fabric material".

In an embodiment, the recycled dry fibers are recycled carbon fibers and/or recycled glass fibers. Recycled dry fibers will be understood as dry fibers that are obtained from previously used cured parts or reused scrap dry fabrics materials. The second life for carbon fiber and/or glass fiber is key for environmental reasons and also provides a low cost material. An advantage of using recycled fibers for the dry fiber mat is that discarded fibers are used to produce new fully functional parts. Also, for panels prone to suffer impacts, the variation in the dry fibers orientation plus the isotropy of mechanical properties results in improved behavior compared to other fabric materials or non-crimp fabric materials. By contrast, the dry fiber mats made of fabric material and non-crimp fabric materials (with non-recycled fibers) are each laminated according to a predefined orientation previously determined.

In a particular embodiment, the fabric material and/or the non-crimp fabric material of at least one dry fiber mat comprises recycled dry fibers and the fabric material and/or the non-crimp fabric material of another dry fiber mat comprises raw dry fibers. Raw dry fibers must be understood as non-recycled fibers or fibers that have not been used before. As mentioned above, the recycled dry fibers form a woven or non-woven dry fiber mat with no preferred fiber orientation, that is, the recycled dry fibers that conform the fabric material and/or the non-crimp fabric material of the dry fiber mat are misaligned.

The thickness of the dry fiber mats used depends on the quantity of fiber per square meter used. Thus, the thickness can be adapted depending on the density of the mat. The preferred values for the thickness of the dry fiber mat are in the range of 0.1 millimeter to 50 millimeter before resin impregnation or application of any vacuum.

Furthermore, the preferred values for the length of the dry fibers are in the range of 5 millimeter to 50 millimeter; however, dry fibers with a longer length can be also used depending on the recycled fibers or the fabric materials used.

The present method provides a panel core comprising two faces according to step b). In embodiments with only two dry fiber mats, each dry fiber mat is placed on a different face of the panel core—or simply core—that is, the two dry fiber mats are laid-up each on one face of the panel core according to step c). In embodiments with more than two dry fiber mats, at least one dry fiber mat is placed on each face of the panel core and several dry fiber mats may be placed on one or both of the faces of the panel core.

Next, the method provides a step d) of resin infusion for impregnating with resin the dry fiber mats, so that the dry fiber mats are bonded to the panel core thanks to the resin. Particularly, this resin infusion process is performed under vacuum conditions.

Finally, after the mentioned resin infusion process, a step e) of curing the resin is performed in order to obtain the sandwich panel. This step of curing is performed particularly at least under vacuum and temperature cycle. The at least two dry fiber mats and the panel core impregnated with resin are subjected to a curing cycle where temperature, pressure and/or vacuum is applied over a predetermined time.

The drapability of the dry fiber mat is an enormous advantage for complex panel core geometries. Thus, the above described process is valid for the manufacturing of:
  flat, curved or highly curved panels,
  panels with any type of core shape,
  any panel size,
  panels with more than one unique panel core,
  panels including large monolithic areas in combination with panel cores,
  panels with panel cores of any material/density/strength, and
  panels comprising any additional material (i.e., lightning strike mesh or foils).

Another advantage of the present manufacturing method is that the dry fiber used for the dry fiber mat does not need special storage conditions. Besides, the method generally does not need using an autoclave, provides a panel with a full water-tightness structure and reduces, or even eliminates, the defects produced by the use of standard vacuum used during the production of panel structures (i.e., core crushing) according to the prior art.

Additionally, these fabric material and non-crimp fabric material are particularly resistant to damage, and therefore, they can be also used for sandwich panels intended to be located in the floors of the aircraft as they are prone to damage due to the daily use (e.g., hells, trolleys . . . ). Also, belly fairing panels and dado panels are preferred applications as these parts are prone to suffer damage.

In a particular embodiment, the sandwich panel manufactured with the present method is intended to be used in an aircraft cabin, and due to safety restrictions, the length of the fibers is larger than 5 millimeters and the material of the resin used for the resin infusion fulfills fire, smoke and toxicity requirements.

In a particular embodiment, after step e), the method further comprises a step of bonding an autoadhesive elastomeric film on an external surface of the sandwich panel. In order to further improve the impact and damping behaviors of the panels, an external surface of the sandwich panel can be improved by modifying it during a curing process. Specifically, this improvement is achieved by means of an autoadhesive elastomeric film that is bonded on an external surface of the sandwich panel that, for example, is intended to form the floor of an aircraft.

In a particular embodiment, before step c), the method further comprises:
  impregnating with elastomeric material at least one dry fiber mat along part of its thickness; and
  curing the elastomeric material with the at least one dry fiber mat by means of a vulcanization process;
  and in step c) the at least one dry fiber mat with the cured elastomeric material is laid-up as an external ply of the sandwich panel on one face of the panel core, with the elastomeric material corresponding to an external surface of the sandwich panel.

In this embodiment, an external surface of the sandwich panel is improved by modifying its external ply before the infusion process. In particular, an elastomeric material partially impregnates one dry fiber mat; that is, the elastomeric material impregnates just part of the dry fiber mat thickness and meantime the other part thereof remains without impregnation. In the particular embodiment wherein this dry fiber mat is made of misaligned fibers fabric material, part of the fibers are entrapped inside the elastomeric material.

Once impregnated, the elastomeric material is vulcanized in order to cure the elastomeric material with the dry fiber mat. Next, the structure formed by the dry fiber mat and the cured elastomeric material is laid-up on one face of the panel core according to step c) during the present panel manufacturing process, locating the part of the dry fiber mat impregnated with elastomeric material as an external surface of the sandwich panel. Finally, during the infusion process in step d), the resin further impregnates the part of the dry fiber mat that is not impregnated with the elastomeric material together with the panel core.

The anchorage of a dry fiber mat into the elastomeric material is done during the impregnation and vulcanization processes. Once at least the dry fiber mat with elastomeric material, the other dry fiber mat already provided and the panel core are cured, the elastomeric material will not be detached from the dry fiber mat as the fibers make a physical anchorage between the elastomeric material and this dry fiber mat. Therefore, it is unlikely that the elastomeric material could be detached from the panel.

Moreover, in order to improve the adherence between fibers and elastomeric material, the surface of the dry fiber mat can be modified by sizing, resin impregnation and/or binder application, among others, for improving compatibility between the dry fiber mat and the elastomeric material without detrimentally affect the subsequent compatibility between the dry fiber mat and the resin used in the step d) for resin infusion process.

The elastomeric material is positioned as an external surface of the sandwich panel; for example, to configure the surface of the sandwich panels intended to form the floor of an aircraft.

This partial impregnation of the dry fiber mats with elastomeric material achieves an improvement of impact and noise damping behaviors of the sandwich panel. Even in the unlikely case in that the elastomeric material is debonded from the composite material (referred to the set formed by the panel core cured together with the dry fiber mats), the impact and damping behaviors are kept.

In an embodiment, substantially half of the thickness of the dry fiber mat is impregnated with elastomeric material.

In an embodiment, before the impregnation with elastomeric material and/or before the bonding of an autoadhesive elastomeric film, the method further comprises adding a reinforcing and/or protective film to an outer side of the elastomeric material and/or to an outer side of the autoadhesive elastomeric film.

This reinforcing and/or protective film allows to improve damping and/or impact resistance properties of the sandwich panels once manufactured. The outer side of the elastomeric material or of the autoadhesive elastomeric film corresponds to an outer (or external) surface of the finished sandwich panel.

In a more particular embodiment, the protective film is a Teflon (PTFE) layer that provides better erosion resistance properties in the event that the elastomeric material layer or autoadhesive elastomeric film remains on the outside of the sandwich panel and may be subject to friction. The Teflon layer allows easier sliding on the sandwich panel surface, thus reducing erosion thereof.

In another embodiment, the protective film is a layer of polyester fabric impregnated with elastomeric material, which is called "low friction treatment", providing likewise resistance to tearing, erosion and also facilitating sliding.

As reinforcement, instead of polyester fabric, fiberglass fabric or other materials can be used.

The Teflon layer requires a chemical treatment to adhere well to the elastomeric material and then vulcanize with the elastomeric material. Instead, the polyester or fiberglass fabric layer impregnated with elastomeric material or autoadhesive elastomeric film is vulcanized with the elastomeric material without the need for chemical treatment.

In a particular embodiment, step a) comprises providing at least one additional dry fiber mat, and before step c) the method comprises:
  impregnating with elastomeric material adjacent surfaces of two dry fiber mats, along part of the thickness of the two dry fiber mats; and
  curing the elastomeric material with the two dry fiber mats by means of a vulcanization process;
  wherein in step c) the two dry fiber mats with the cured elastomeric material are laid-up as an external ply of the sandwich panel on one face of the panel core.

In this embodiment, an external surface of the sandwich panel is improved by modifying its external ply before the infusion process according to step d).

In particular, an elastomeric material partially impregnates adjacent surfaces of two dry fiber mats; that is, the elastomeric material impregnates just part of the thickness of two different dry fiber mats and meantime the other parts thereof remain without elastomeric material impregnation. In the particular embodiment wherein the dry fiber mats are made of misaligned fibers fabric material, part of these fibers are entrapped inside the elastomeric material.

The impregnated parts of the dry fiber mats are placed adjacent to each other and, after that, the elastomeric material is vulcanized in order to cure the dry fiber mats with the elastomeric material. Next, the structure formed by the dry fiber mats and the cured elastomeric material is laid-up on one side of the panel core during the panel manufacturing process according to step c), forming an external ply or surface of the sandwich panel while other dry fiber mat is laid-up on the other side of the panel core. Finally, during the infusion process according to step d), the resin impregnates the thickness of the dry fiber mats that are not impregnated with elastomeric material together with the panel core as well as also impregnates the other dry fiber mat together with the panel core.

The anchorage of the dry fiber mat into the elastomeric material is done during the impregnation and vulcanization processes. Once the dry fiber mats impregnated with elastomeric material are cured, the elastomeric material will not be detached from the dry fiber mats as the fibers make a physical anchorage between the elastomeric material and the dry fiber mats. Therefore, it is unlikely that the elastomeric material could be detached from the sandwich panel.

This partial impregnation of the mats with elastomeric material achieves an improvement of impact and noise damping behaviors of the panel. Even in the unlikely case in that the elastomeric material is debonded from the panel (in particular, from the dry fiber mats), the impact and damping behavior are kept.

Additionally, the elastomeric material can be also recycled, at a certain percentage, from other industries.

In an embodiment, substantially half of the thickness of the dry fiber mats is impregnated with elastomeric material.

In a particular embodiment, the impregnation with elastomeric material and/or the bonding of autoadhesive elastomeric film is performed by means of a calendering process or a rubber transfer molding process.

A calendering process will be understood as the application of a thin elastomeric material layer to a dry fiber mat. This elastomeric material layer is passed between calender rollers at high temperature and pressure in order to obtain the desired thickness before being applied to the dry fiber mat. In the context of the invention, during the calendering process, at least one dry fabric mat is impregnated with an elastomeric material.

During the calendering process, the elastomeric material partially impregnates the dry fiber mat by means of the pressure and heat applied by the calender rollers. After the calendering process, the impregnated dry fiber mat with the elastomeric material is subjected to a vulcanization process to cure the elastomeric material with the dry fiber mat.

In an embodiment, the heating process is done by external means, such as radiant heaters. In an alternative embodiment, the elastomeric material comprises an elastomeric matrix and conductive particles and/or fibers and the heating process is done using an electromagnetic heating system or an ultraviolet heating system for the homogeneous curing of the dry fiber mat with the elastomeric material.

In a preferred embodiment, in order to facilitate the impregnation of the dry fiber mat, the materials and the calender rollers are pre-heated just before the calendering process itself.

In a preferred embodiment, the calender rollers have a non-homogenous surface, for example a surface with protuberances, in order to force the dry fiber mat into the elastomeric material.

The vulcanization process is preferably done between 150° C.-200° C. if silicone rubber is used as elastomeric material. Alternatively, the vulcanization process is preferably done between 100° C.-130° C. in case polyurethanes are used as elastomeric material.

Depending on the thickness of the elastomeric material to be applied, the calendering process or the rubber transfer molding process is used. That is, for a smaller thickness of elastomeric material, the calendering process is preferably used and for greater thicknesses of elastomeric material the rubber transfer molding process is preferably used.

Depending on the specific application of the present sandwich panel, a reinforcing/protective film can be added to the outer side of the elastomeric material before the calendering process with the purpose to improve damping and/or impact resistance properties.

In an example in which the final application of the sandwich panel is for interiors, such as aircraft cabin, the elastomeric material preferably comprises an elastomeric matrix and retardant agents. This advantageously ensures compliance with flammability, smoke and toxicity requirements.

In an embodiment, before the impregnation with elastomeric material, the method comprises adding a reinforcing fabric embedded into the elastomeric material.

A reinforcing fabric improves damping and/or impact resistance properties of the sandwich panel once manufactured. In addition, the reinforcing fabric embedded into the elastomeric material also provides tear resistance properties.

The provision of a reinforcing fabric embedded into the elastomeric material is performed by pre-impregnating with elastomeric material the reinforcing fabric by a calendering process using rollers that work by compression and heat. Once the pre-impregnation of the reinforcing fabric is carried out, a reinforced elastomeric material is obtained which can be used to impregnate the dry fiber mat. For impregnating the dry fiber mat with the reinforced elastomeric material, a subsequent calendering process may be performed to embed the dry fiber mat with the reinforced elastomeric material, after which this dry fiber mat would work as reinforcement as well. After the pre-impregnation, a vulcanization process is performed to cure the reinforced elastomeric material with the dry fiber mat.

In an embodiment, the elastomeric material and/or the autoadhesive elastomeric film is selected from the group of:
  silicone rubber with low flammability properties;
  melted mixture of virgin silicone rubber with low flammability properties and a predetermined percentage of recycled silicone rubber;
  polyurethane rubber with a predetermined concentration of siloxane compounds;
  melted mixture of virgin polyurethane rubber with a predetermined concentration of siloxane compounds and a predetermined percentage of recycled polyurethane rubber;
  one of the previous in combination with retardant agents and/or with conductive particles and/or conductive fibers.

In an embodiment, one or several from: the ration between dry fiber mat and elastomeric material, the density of the dry fiber mat, the pressure, the temperature and the minimum length of the fibers of the dry fiber mat are set to optimize the impregnation of the dry fiber mat with elastomeric material.

In an embodiment wherein the elastomeric material is a mixture of two or more components, such as a mixture of virgin rubber and recycled rubber or a mixture of polyurethane rubber and siloxane compounds, the proportion of at least one component is set to optimize the impregnation of the dry fiber mat with elastomeric material.

In an embodiment, the composition of the elastomeric material and/or any of the above parameters are set based on peel strength comparative essays to determine the conditions in which the elastomeric material is best adhered to the dry fiber mat.

The minimum length of the fibers of the dry fiber mat is defined as the one needed to get a proper impregnation thereof with the elastomeric material and to achieve a proper anchorage of the fibers in the elastomeric material after the vulcanization process.

According to an embodiment, this minimum length is set depending on the density of the dry fiber mat and thickness of the elastomeric material used. For instance, 5 millimeters minimum length for 2 millimeters elastomeric film.

In an embodiment, the method comprises modifying the surface of the at least one dry fiber mat.

In an embodiment, the method further comprises stitching the elastomeric material and/or the autoadhesive elastomeric film to at least one dry fiber mat.

This stitching process, which can be performed for any embodiment where an elastomeric material impregnates—at least partially—a dry fiber mat made of recycled dry fibers, allows to improve the handleability of the dry fiber mat impregnated with elastomeric material and being cured.

In an embodiment, the method further comprises, before step c), applying a stitching process and/or a binder on at least one surface of at least one dry fiber mat.

In order to assure a homogeneous thickness of a dry fiber mat and handleability of the dry fiber mat impregnated with elastomeric material and being cured, in this embodiment a stitching process and/or binder is applied on a surface of the dry fiber mat to facilitate its positioning when laying-up on step c).

In an embodiment, in step b) the panel core provided comprises a foam core or a honeycomb core.

In an embodiment, the provided panel core comprises a honeycomb core having honeycomb cells, and on both sides of the honeycomb core, from the inside to the outside, a curable adhesive layer and an amorphous thermoplastic film. In this embodiment before step d) the method further comprises:
  confining the panel core in a gas-tight space;
  producing a vacuum in the gas-tight space, and subsequently curing at least partially the adhesive layers, so that the honeycomb cells of the honeycomb core are at least partly evacuated before they are sealed by the at least partially cured adhesive layer and the amorphous thermoplastic films.

In this embodiment, the provided panel core comprises a honeycomb core with honeycomb cells, and a curable adhesive layer and an amorphous thermoplastic film at each side of the honeycomb core. The method additionally comprises arranging the panel core in a gas-tight space and producing vacuum in the gas-tight space.

In this way, the honeycomb cells are at least partly evacuated and, after that, they are sealed by curing the adhesive layers and the amorphous thermoplastic films. Due to this sealing, resin is prevented from going into the honeycomb core cells while infusing according to step d).

In an embodiment, before step d), the method further comprises arranging the at least two dry fiber mats and the panel core on a one-sided mold and confining the mold in a gas-tight space by arranging a vacuum sheet over the mold.

In this embodiment, before infusing with resin, the dry fiber mats and the panel core are arranged on a one-sided mold. The mold is confined in a gas-tight space arranging a vacuum sheet over it.

In the case of providing a panel core as the one described in the previous embodiment, the curing of the adhesive layer under vacuum can be partially or completely performed before the step c) of laying-up the dry fiber mats over both sides of the panel core. Then, the set of the dry fiber mat and the panel core is arranged in the mold before applying the vacuum. Next, the curing of the adhesive layer and the amorphous thermoplastic film is completed, if it is needed, to seal the panel core and, finally, the set is impregnated with resin that is then cured under vacuum.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

The present invention provides a method for manufacturing an aeronautical sandwich panel with improved capabilities compared to the prior art solutions, particularly, a sandwich panel with improved impact and damping behaviors.

This method comprises at least the following steps:
providing at least two dry fiber mats (2), being each dry fiber mat (2) made from: fabric material or non-crimp fabric material;
providing a panel core (3) comprising two faces;
laying-up the two dry fiber mats (2), each on one face of the panel core (3);
impregnating with resin (4) the dry fiber mats (2) and the panel core (3), once laid-up, by a resin infusion process under vacuum; and
obtaining the sandwich panel (1) by curing the resin (4) under vacuum and temperature cycle.

Figure 1A:
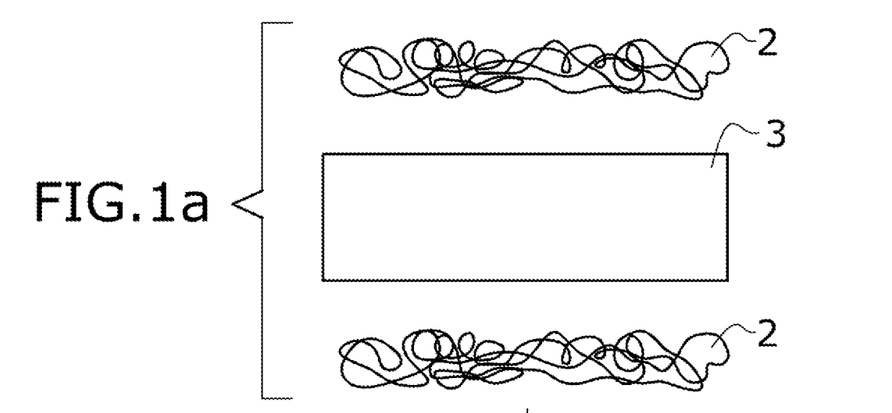
FIGS. 1a-1c show a schematic view of steps of a method for manufacturing a panel according to an embodiment of the present invention.
Figure 1B:
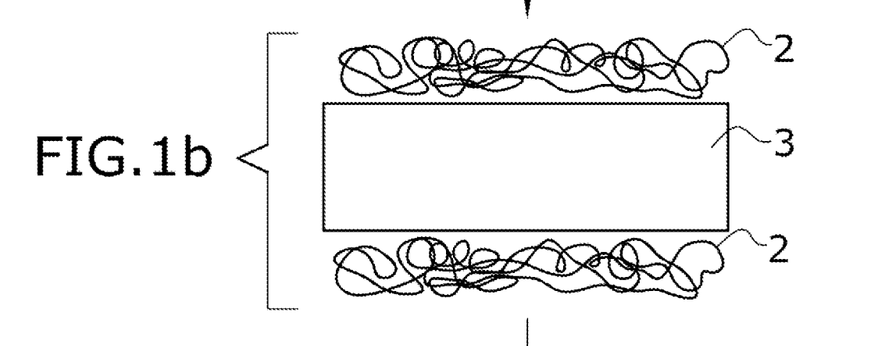
Figure 1C:
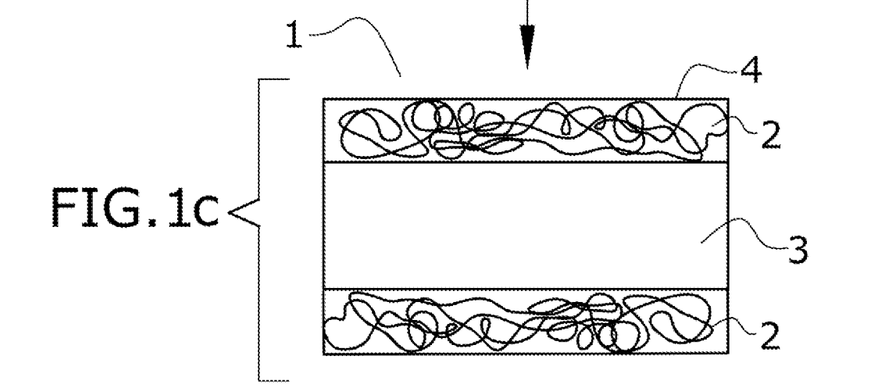

FIGS. 1a-1b show some of the manufacturing steps that the present method follows to obtain a sandwich panel (1) according to an embodiment. Particularly, FIG. 1a shows the provision of two dry fiber mats (2) according to step a) of the above method and the provision of a panel core (3) according to step b) of the above method. Preferably, the fabric material and/or the non-crimp fabric material of the dry fiber mats (2) comprise carbon fibers and/or glass fibers. Preferably, the panel core (3) comprises a foam core or a honeycomb core. The method comprises laying-up the two dry fiber mats (2) each on one face of the panel core (3), as shown in FIG. 1b. Once the dry fiber mats (2) are laid-up on each face of the panel core (3), the dry fiber mats (2) and the panel core (3) are impregnated with resin (4) by a resin infusion process under vacuum conditions. This resin impregnation corresponds to step d) of the method and is shown in FIG. 1c. After step d), the set of dry fiber mats (2) and panel core (3), all of it impregnated in resin (4), is cured under vacuum and temperature cycle according to step e) of the present method to obtain the sandwich panel (1).

In a particular example, the fabric material and/or the non-crimp fabric material of one or both of the dry fiber mats (2) comprise recycled dry fibers with different orientations within the material.

In a particular example, after step e) the method further comprises a step of bonding an autoadhesive elastomeric film on an external surface of the sandwich panel (1).

Figure 2A:
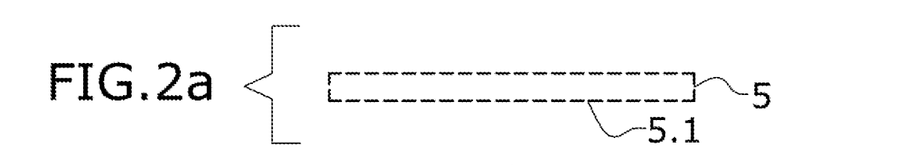
FIGS. 2a-2d show a schematic view of steps of a method for manufacturing a panel according to another embodiment of the present invention.
Figure 2B:
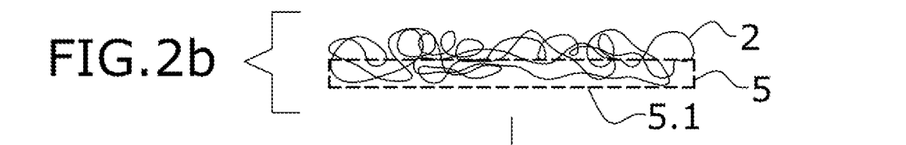

According to another embodiment, FIGS. 2a-2d show some of the manufacturing steps of the present method. FIG. 2a shows the provision of an elastomeric material (5). Before step c), the method further comprises impregnating with elastomeric material (5) at least one dry fiber mat (2) along part of its thickness and curing the elastomeric material (5) with the dry fiber mat (2). This impregnation of the dry fiber mat (2) with elastomeric material (5) is shown in FIG. 2b. The dry fiber mat (2) with the elastomeric material (5) is cured using a vulcanization process.

Figure 2C:
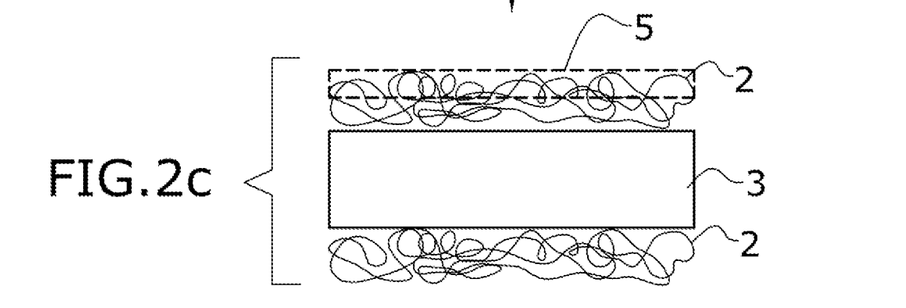
Figure 2D:
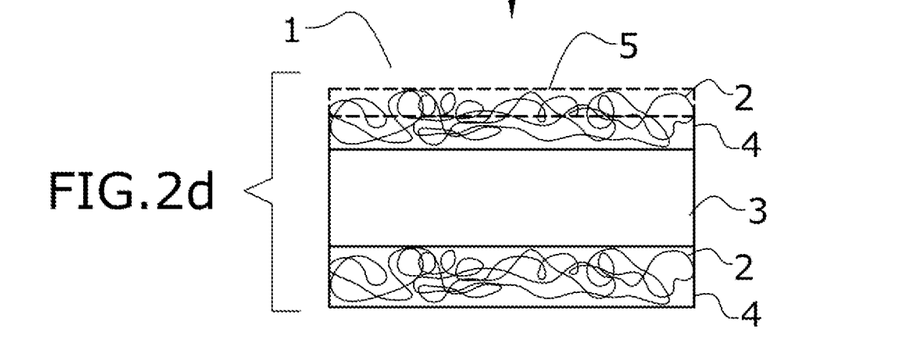

Once the dry fiber mat (2) is cured with the elastomeric material (5), then the dry fiber mat (2) with the cured elastomeric material is laid-up on one face of the panel core (3) so that the elastomeric material (5) is arranged on an external side of the sandwich panel (1). FIG. 2c shows the step c) of laying-up the dry fiber mat (2) with the cured elastomeric material (5) on one face of the panel core (3) and another dry fiber mat (2) on the other face of the panel core (3). Once the dry fiber mats (2)— with and without elastomeric material (5)— are laid-up each on one face of the panel core (3), the set shown in FIG. 2c is impregnated with resin (4), according to step d), by a resin infusion process under vacuum conditions (shown in FIG. 2d). Finally, after step d) the set of dry fiber mat (2) with cured impregnated elastomeric material (5), the other fiber mat (2), and the panel core (3), all of it impregnated in resin (4), is cured under vacuum and temperature cycle according to step e) of the present method to obtain the sandwich panel (1). The sandwich panel (1) obtained according to this embodiment comprises the elastomeric material (5) as an external surface of the sandwich panel (1).

In an embodiment, the fabric material and/or the non-crimp fabric material of the dry fiber mat (2) impregnated with elastomeric material (5) comprises recycled dry fibers with different orientations within the material.

Figure 3:
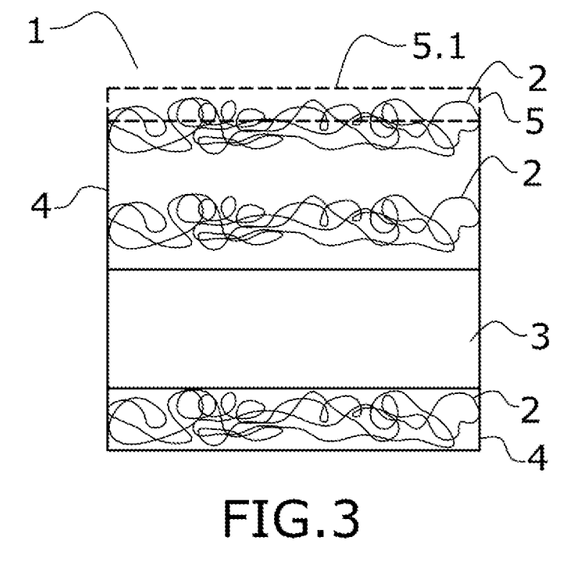
FIG. 3 shows a schematic view of a panel obtained by a method according to another embodiment of the present invention.

FIG. 3 shows a sandwich panel (1) obtained by the method according to an embodiment of the invention. According to this embodiment, step a) comprises providing a plurality of dry fiber mats (2). In particular, the sandwich panel (1) shown in this figure comprises three dry fiber mats (2). One of the dry fiber mats (2) is impregnated with an elastomeric material (5) before step c) as shown in FIG. 2b. In step c) of the present embodiment, first other of the dry fiber mats (2), which is located adjacent to the previous one and is free of elastomeric material (5), is laid-up on one face of the panel core (3) and then the dry fiber mat (2) previously cured with the elastomeric material (5) is laid-up on the dry fiber mat (2) already laid-up on the one face of panel core (3). Besides, the third dry fiber mat (2) is also laid-up on the other face of the panel core (3). This set as shown in FIG. 3 is impregnated with resin (4), according to step d), by a resin infusion process under vacuum conditions. Finally, after step d) the set of the three dry fiber mats (2) and the panel core (3), all of it impregnated in resin (4), is cured under vacuum and temperature cycle according to step e) of the present method to obtain the sandwich panel (1).

In an embodiment, the fabric material and/or the non-crimp fabric material of the dry fiber mat (2) impregnated with elastomeric material (5) comprises recycled dry fibers with different orientations within the material.

Figure 4A:
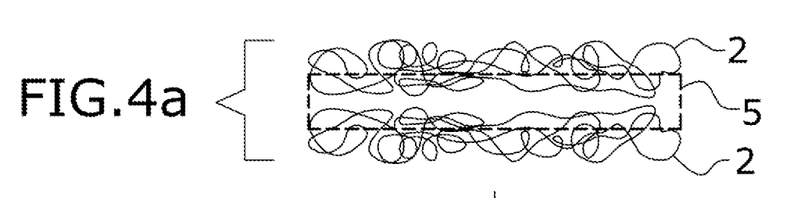
FIGS. 4a-4b show a schematic view of steps of a method for manufacturing a panel according to an embodiment of the present invention.
Figure 4B:
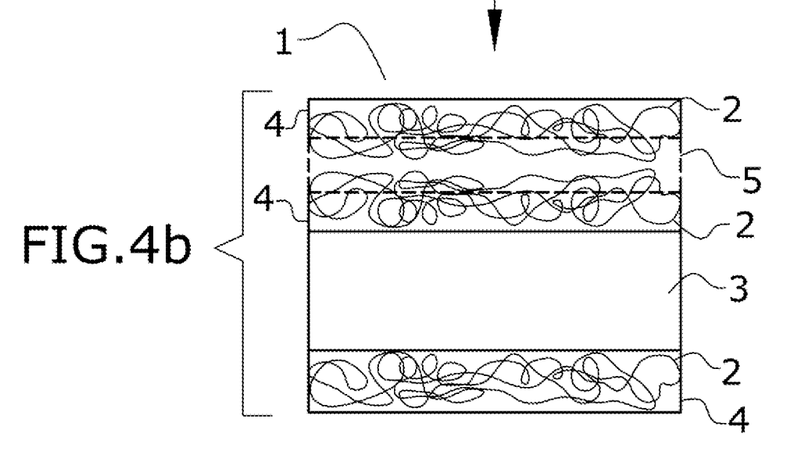

FIGS. 4a-4b show some of the manufacturing steps of the present method according to an embodiment. Before step c), the method comprises impregnating with elastomeric material (5) adjacent surfaces of two dry fiber mats (2) along part of the thickness of the two dry fiber mats (2), and curing the elastomeric material (5) with the two dry fiber mats (2) by means of a vulcanization process. These two dry fiber mats (2) impregnated with an elastomeric material (5) are shown in FIG. 4a. Once the dry fiber mats (2) are cured with the elastomeric material (5), then the dry fiber mats (2) with the cured elastomeric material are laid-up on one face of the panel core (3) as an external ply of the sandwich panel (1). FIG. 4b shows the step c) of laying-up the dry fiber mats (2) with the cured elastomeric material (5) on one face of the panel core (3). FIG. 4b also shows a third dry fiber mat (2) laid-up on the other face of the panel core (3). Once the dry fiber mats (2) with and without the cured elastomeric material (5) are laid-up on both sides of the panel core (3), this set as shown in FIG. 4b is impregnated with resin (4), according to step d), by a resin infusion process under vacuum conditions. Finally, after step d) the set of dry fiber mats (2) with cured impregnated elastomeric material (5), the dry fiber mat (2) without elastomeric material, and the panel core (3), all of it impregnated in resin (4), is cured under vacuum and temperature cycle according to step e) of the present method to obtain the sandwich panel (1).

In an embodiment, the fabric material and/or the non-crimp fabric material of the dry fiber mats (2) impregnated with elastomeric material (5) comprises recycled dry fibers with different orientations within the material.

In an embodiment, the elastomeric material (5) is selected from the group of: silicone rubber with low flammability properties; melted mixture of virgin silicone rubber with low flammability properties and a predetermined percentage of recycled silicone rubber; polyurethane rubber with a predetermined concentration of siloxane compounds; melted mixture of virgin polyurethane rubber with a predetermined concentration of siloxane compounds and a predetermined percentage of recycled polyurethane rubber; or one of the previous in combination with retardant agents and/or with conductive particles or conductive fibers.

Figure 5:
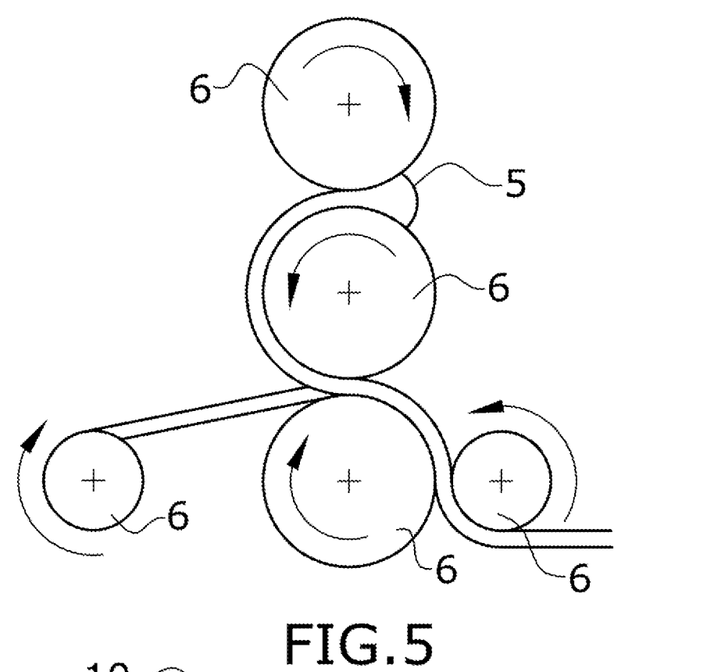
FIG. 5 shows a schematic view of a calendering process according to an embodiment of the present invention.
Figure 6:
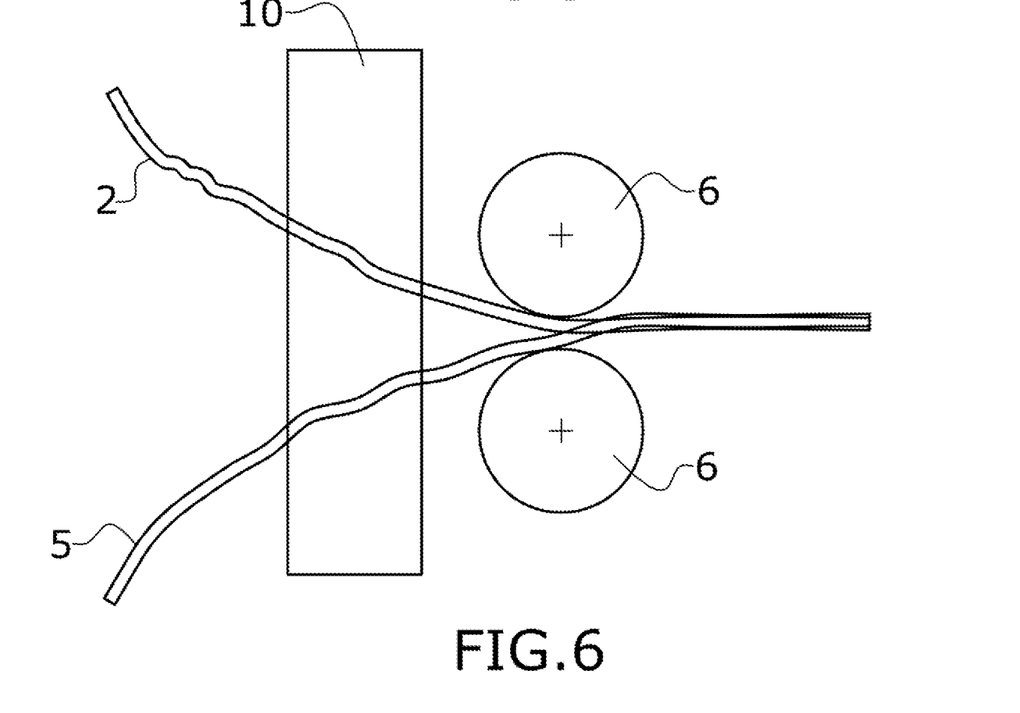
FIG. 6 shows a schematic view of an elastomeric material impregnation process according to an embodiment of the present invention.

In an embodiment the impregnation of dry fiber mats (2) with an elastomeric material (5) film is performed by a calendering process, as shown in FIGS. 5 and 6. In the calendering process, the elastomeric material (5) partially impregnates at least one dry fiber mat (2) by means of the pressure and heat applied by calender rollers (6) as shown in FIG. 5. In the calendering process shown in FIG. 6, heat is previously applied by heating means (10) to the elastomeric material (5) and the dry fiber mat (2) before the impregnation.

After the calendering process, the impregnated dry fiber mat (2) is subjected to a vulcanization process to cure the elastomeric material (5). Particularly, the vulcanization process is performed between 150° C. and 200° C. if silicon rubber is used as elastomeric material (5), or between 100° C. and 130° C. if polyurethanes are used as elastomeric material (5).

Preferably, in order to facilitate the elastomeric impregnation of the dry fiber mat (2), the dry fiber mat (2), the elastomeric material (5) and the calender rollers (6) are pre-heated just before the calendering process starts. In a particular example, the heating step is performed by external heating means (such as radiant heaters) or by including resistive fibers or particles in the elastomeric material (5).

In order to improve the calendering process, the calender rollers (6) may have a non-homogenous surface (such as with protuberances) in order to force the dry fiber mat (2) into the elastomeric material (5).

Moreover, in case a thicker elastomeric material impregnation is necessary, then an alternative process known as rubber transfer molding process is performed.

In a particular example, according to the embodiments shown in FIGS. 2 to 4, before the impregnation with elastomeric material (5) the method further comprises adding a reinforcing fabric embedded into the elastomeric material (5).

In another particular example, the method further comprises stitching the elastomeric material (5) to at least one of the dry fiber mats (2).

Furthermore, before step c), the method may further comprise applying a stitching process and/or binder on at least one surface of the dry fiber mat (2).

In a particular example, before impregnation with elastomeric material (5) according to the embodiment shown in FIGS. 2 and 3, the method further comprises adding a reinforcing and/or protective film to an outer side (5.1) of the elastomeric material (5). In this sense, the elastomeric material (5) provided according to FIGS. 2a and 3 comprises a reinforcing and/or protective film on its outer side (5.1).

In a particular example according to the embodiment shown in FIG. 1, after step e) the method further comprises a step of bonding an autoadhesive elastomeric film on an external surface of the sandwich panel (1) and a step of adding a protective film to an outer side (5.1) of the elastomeric film.

Although provision of one or two dry fiber mats has been described in the previous embodiments, it will be understood that more than two dry fiber mats may be provided on one or both sides of the panel core.

Figure 7:
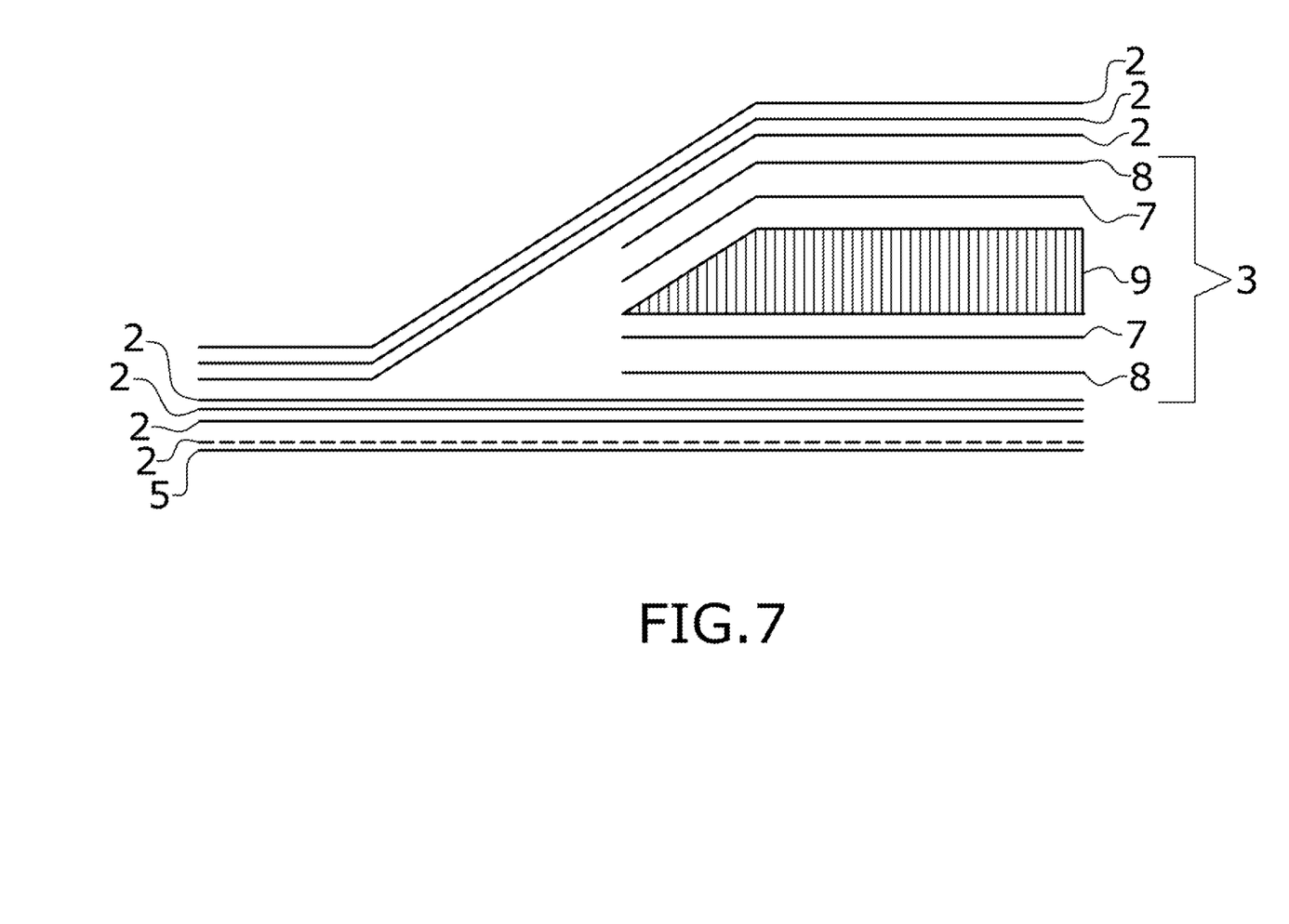
FIG. 7 shows a schematic view of a sandwich panel with a honeycomb core according to an embodiment of the present invention.

FIG. 7 shows a sandwich panel (1) comprising a panel core (3) comprising a honeycomb core. Particularly, FIG. 7 shows a honeycomb core (9) having honeycomb cells and, at both sides of the honeycomb core, from the inside to the outside: bottom and top curable adhesive layers (7), and bottom and top amorphous thermoplastic films (8). According to this FIG. 7, the method further comprises before step d) the following steps:
 confining the panel core (3) in a gas-tight space; and
 producing a vacuum in the gas-tight space, and subsequently curing at least partially the adhesive layers (7), so that the honeycomb cells of the honeycomb core (9)

are at least partly evacuated before are sealed by the at least partially cured adhesive layers (7) and the amorphous thermoplastic films (8).

The amorphous thermoplastic films (8) (or little semi-crystalline, i.e., preferably less than 5% of crystallinity degree) are, for exemplary purposes, Polyvinyl Fluoride (PVF), Polyetherketoneketone (PEKK), Polyaryletherketone (PAEK), Polyether ether ketone (PEEK), Polyethylenimine (PEI) or Polyphenylene sulfide (PPS). Advantageously, these amorphous thermoplastic films (8) have a surface treatment to improve adhesion with their respective adhesive layers (7).

The honeycomb core (9) is, preferably, but not limited to, a hexagonal-cells polyamide paper with phenolic resin impregnated. The adhesive films (7) for composite bonding are preferably, but not limited to, structural epoxy with dual curing temperature: 120° C. and 180° C. curing.

During the process of curing the adhesive layers (7) air extraction from honeycomb core cells is performed to avoid the air being trapped inside. That is, the honeycomb cells are at least partly evacuated before they are sealed by the curable adhesive layers (7) and the amorphous thermoplastic films (8). Accordingly, a certain vacuum level is preferably applied to the set formed by the honeycomb core with the adhesive layers (7) and the amorphous thermoplastic films (8), at room temperature to allow such air extraction and then, heat is gradually applied while maintaining such vacuum. This vacuum level should be the maximum level that avoids core collapsing, which is an effect that depends, inter alia, on the core geometry, chamfer slope and core density. Thus, the standard vacuum level for a sandwich panel is typically between 200-400 mbar.

Then, the process continues, also before step d), by arranging the at least two dry fiber mats (2) and the panel core (3) on a one-side mold and confining the mold in a gas-tight space by arranging a vacuum sheet over the mold. FIG. 7 shows the sandwich panel (1) with the panel core (3) and a plurality of dry fiber mats (2) arranged at each side of the panel core (3). In this embodiment, the dry fiber mat (2) provided as an external ply of the sandwich panel (1) at one side is made of misaligned fibers fabric material and has been impregnated with elastomeric material (5) along part of its thickness and cured with the elastomeric material (5). This dry fiber mat (2) made of misaligned fibers fabric material is represented in dashed line. Each of the other dry fiber mats (2) may be also made of misaligned fibers fabric material and/or may be laminated according to a predefined orientation.

Preferably, vacuum is also applied for a predetermined time between adhesive curing and resin infusion to mitigate the air expansion during the following curing cycle because of the high temperature. The exact time varies depending on core size, density and vacuum level applied previously.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a sandwich panel, said method comprising:
   a) providing at least two dry fiber mats, each dry fiber mat being made from fabric material or non-crimp fabric material;
   b) providing a panel core comprising two faces;
   c) laying-up the dry fiber mats on the panel core, at least one dry fiber mat being laid on each face of the panel core;
   d) impregnating with resin the dry fiber mats and the panel core, once laid-up, by a resin infusion process under vacuum; and
   e) obtaining the sandwich panel by curing the resin under vacuum and temperature cycle,
   wherein before step c) the method further comprises:
       impregnating with elastomeric material at least one dry fiber mat along part of a thickness thereof; and
       curing the elastomeric material with the at least one dry fiber mat by means of a vulcanization process;
       wherein in step c) the at least one dry fiber mat with the cured elastomeric material is laid-up as an external ply of the sandwich panel on one face of the panel core with the elastomeric material corresponding to an external surface of the sandwich panel.

2. The method according to claim 1, wherein at least one of the fabric material or the non-crimp fabric material of at least one dry fiber mat comprises recycled dry fibers with different orientations within the fabric material.

3. The method according to claim 1, wherein after step e) the method further comprises a step of bonding an autoadhesive elastomeric film on an external surface of the sandwich panel.

4. The method according to claim 3, wherein before at least one of the impregnation with elastomeric material or the bonding of an autoadhesive elastomeric film, the method further comprises adding at least one of a reinforcing or protective film to at least one of an outer side of the elastomeric material or to an outer side of the autoadhesive elastomeric film.

5. The method according to claim 3, wherein the at least one of impregnation with elastomeric material or the bonding of autoadhesive elastomeric film is performed by means of a calendering process or a rubber transfer molding process.

6. The method according to claim 3, wherein the at least one of the elastomeric material or a material of the autoadhesive elastomeric film is selected from a group consisting of:
   silicone rubber with low flammability properties;
   a melted mixture of virgin silicone rubber with low flammability properties and a predetermined percentage of recycled silicone rubber;
   polyurethane rubber with a predetermined concentration of siloxane compounds;
   a melted mixture of virgin polyurethane rubber with a predetermined concentration of siloxane compounds and a predetermined percentage of recycled polyurethane rubber; or
   one of the previous group members in combination with at least one of retardant agents or conductive particles or fibers.

7. The method according to claim 3, wherein the method further comprises stitching at least one of the elastomeric material or the autoadhesive elastomeric film to at least one dry fiber mat.

8. The method according to claim 1, wherein before the impregnation with elastomeric material, the method further comprises embedding a reinforcing fabric into the elastomeric material.

9. The method according to claim 1, further comprising, before step c), applying at least one of a stitching process or a binder on at least one surface of at least one dry fiber mat.

10. The method according to claim 1, wherein the at least one of the fabric material or the non-crimp fabric material of at least one dry fiber mat comprises recycled dry fibers and the at least one of the fabric material or the non-crimp fabric material of another dry fiber mat comprises raw dry fibers.

11. The method according to claim 1, wherein in step b) the panel core provided comprises a foam core or a honeycomb core.

12. The method according to claim 11, wherein the provided panel core comprises a honeycomb core having honeycomb cells, and on both sides of said honeycomb core, from the inside to the outside, a curable adhesive layer and an amorphous thermoplastic film; and wherein before step d) the method further comprises:
confining the panel core in a gas-tight space;
producing a vacuum in said gas-tight space, and subsequently curing, at least partially, the adhesive layers, so that the honeycomb cells of the honeycomb core are at least partly evacuated before they are sealed by the at least partially cured adhesive layers and the amorphous thermoplastic films.

13. The method according to claim 1, wherein before step d) the method further comprises:
arranging the at least two dry fiber mats and the panel core on a one-sided mold and confining the mold in a gas-tight space by arranging a vacuum sheet over said mold.

14. A method for manufacturing a sandwich panel, said method comprising:
a) providing at least two dry fiber mats, each dry fiber mat being made from fabric material or non-crimp fabric material;
b) providing a panel core comprising two faces;
c) laying-up the dry fiber mats on the panel core, at least one dry fiber mat being laid on each face of the panel core;
d) impregnating with resin the dry fiber mats and the panel core, once laid-up, by a resin infusion process under vacuum; and
e) obtaining the sandwich panel by curing the resin under vacuum and temperature cycle,
wherein step a) comprises providing at least one additional dry fiber mat, and wherein before step c), the method comprises:
impregnating, with elastomeric material, adjacent surfaces of two dry fiber mats, along part of a thickness of said two dry fiber mats; and
curing the elastomeric material with said two dry fiber mats by means of a vulcanization process;
wherein in step c), the two dry fiber mats with the cured elastomeric material are laid-up as an external ply of the sandwich panel on one face of the panel core.

* * * * *